(12) United States Patent
Wu et al.

(10) Patent No.: US 10,824,936 B2
(45) Date of Patent: Nov. 3, 2020

(54) RECYCLING SYSTEM AND METHOD BASED ON DEEP-LEARNING AND COMPUTER VISION TECHNOLOGY

(71) Applicant: National Chiao Tung University, Hsinchu (TW)

(72) Inventors: Bing-Fei Wu, Hsinchu (TW); Wan-Ju Tseng, Hualien (TW); Yu-Ming Chen, Taipei (TW); Bing-Jhang Wu, Chiayi (TW); Yi-Chiao Wu, New Taipei (TW); Meng-Liang Chung, Changhua (TW)

(73) Assignee: National Chiao Tung University, Hsinchu (TW)

( * ) Notice: Subject to any disclaimer, the term of this patent is extended or adjusted under 35 U.S.C. 154(b) by 93 days.

(21) Appl. No.: 16/259,245

(22) Filed: Jan. 28, 2019

(65) Prior Publication Data
US 2020/0050922 A1   Feb. 13, 2020

(30) Foreign Application Priority Data
Aug. 13, 2018  (TW) .............................. 107128191 A

(51) Int. Cl.
| | |
|---|---|
| *G06N 3/04* | (2006.01) |
| *G06N 20/20* | (2019.01) |
| *G06K 9/00* | (2006.01) |
| *G06T 5/50* | (2006.01) |
| *B65F 1/00* | (2006.01) |
| *G06T 7/00* | (2017.01) |

(52) U.S. Cl.
CPC ........... *G06N 3/0454* (2013.01); *B65F 1/004* (2013.01); *G06K 9/00201* (2013.01); *G06N 20/20* (2019.01); *G06T 5/50* (2013.01); *G06T 7/0002* (2013.01); *G06T 2207/20084* (2013.01); *G06T 2207/20224* (2013.01)

(58) Field of Classification Search
CPC .. G06N 3/0454; G06N 20/20; G06K 9/00201; G06K 9/6292; G06K 9/6273; G06K 9/4628; G06K 2209/19; G06T 5/50; G06T 7/0002; G06T 2207/20084; G06T 2207/20224; B65F 1/004; B03B 9/06
See application file for complete search history.

(56) References Cited

U.S. PATENT DOCUMENTS 9,639,535 B1   5/2017   Ripley

*Primary Examiner* — Christopher Wait
(74) *Attorney, Agent, or Firm* — Muncy, Geissler, Olds & Lowe, P.C.

(57) ABSTRACT

A recycling system and a method based on deep-learning and computer vision technology are disclosed. The system includes a trash sorting device and a trash sorting algorithm. The trash sorting device includes a trash arraying mechanism, trash sensors, a trash transfer mechanism and a controller. The trash arraying mechanism is configured to process trash in a batch manner. The controller drives the trash arraying mechanism according to the signals of trash sensors and controls the sorting gates of the trash sorting mechanism to rotate. The trash sorting algorithm makes use of the images of trash, wherein the images are taken by cameras in different directions. The trash sorting algorithm includes a dynamic object detection algorithm, an image pre-processing algorithm, an identification module and a voting and selecting algorithm. The identification module is based on the convolutional neural networks (CNNs) and may at least identify four kinds of trash.

10 Claims, 5 Drawing Sheets

RECYCLING SYSTEM AND METHOD BASED ON DEEP-LEARNING AND COMPUTER VISION TECHNOLOGY

CROSS-REFERENCE TO RELATED APPLICATION

This application claims priority from Taiwan Patent Application No. 107128191, filed on Aug. 13, 2018, for the Taiwan Intellectual Property Office, the disclosures of which are hereby incorporated by reference in their entirety.

BACKGROUND OF THE INVENTION

1. Field of the Invention

The present disclosure relates to the field of recycling, in particular, relates to a smart recycling system based on deep learning and computer vision technology.

2. Description of the Related Art

According to the statistics of the Environmental Protection Agency of the Executive Yuan, the amount of recycling in Taiwan has increased year by year with a three-fold increase from 1,056,753 tons in 2001, rising up to 3,319,617 tons in 2015. From the perspective of resource recovery rate, the number rises from 12.68% in 2001 to 45.92% in 2015. With such a rapid increase in resource recovery rate, it is obvious that the problem of recycling needs to be solved.

According to the date from the Organization for Economic Co-operation and Development (OECD), the resource recovery rate has reached 55% and it is comparable with other advanced countries such as Austria, Germany and South Korea, and much higher than the 35% of the US resource recovery rate.

At present, the identification methods of automatic resource recovery systems in Taiwan are mainly based on bar code identification or detecting units other than image identification. Due to the need for bar codes, it is difficult to execute massive implementation and there is also the issue of wasting a lot of time due to the necessity of comparing the data banks.

SUMMARY OF THE INVENTION

To solve the problems mentioned above, the present disclosure provides a recycling system and method based on deep learning and computer vision technology. This system includes: a plurality of cameras, respectively configured to photograph a trash object in a plurality of directions and producing a plurality of trash object images; a controller, connected to the plurality of cameras to receive the plurality of trash object images for identifying a type of the trash object; a trash sorting device, configured to receive the trash object and connected to and controlled by the controller; wherein the controller includes a data storage storing computer codes including: a plurality of artificial neural network models, each trained by images taken in a direction corresponding to the plurality of directions, and identifying the trash object according to the plurality of trash object images to generate a judgment of the type of the trash object; a voting and selecting algorithm, connected to the plurality of artificial neural network models to combine the judgment of each artificial neural network model for generating a determination of the type of the trash object; wherein the trash sorting device delivers the trash object to a trash channel corresponding to the type of the trash object determined by the voting and selecting algorithm.

Preferably, the controller may further include a dynamic object detection algorithm, the dynamic object detection algorithm processes an image subtraction of the plurality of trash object images taken at a time point and a next time point after the time point for detecting whether or not the trash object is passing by the plurality of cameras; if the trash object is passing by, the dynamic object detection algorithm generates a command to drive the plurality of artificial neural network models and the voting and selecting algorithm for identifying the type of the trash object passing by the plurality of cameras; if the trash object is not passing by, the plurality of artificial neural network models and the voting and selecting algorithm are not driven.

Preferably, the trash sorting device may further include a metal sensor connected to the controller; the metal sensor detects whether or not the trash object is metallic and outputs a metal detecting signal to the controller; and the controller identifies the type of the trash object according to the metal detecting signal and the determination of the voting and selecting algorithm.

Preferably, the trash sorting device may further include a cover, disposed over the trash sorting device to block external light; and a light source, disposed under the cover to provide stable light and improve an identification accuracy of the trash object.

Preferably, the trash sorting device may further include: a trash detector, connected to the controller and sensing whether or not the trash object enters the trash sorting device, wherein if the trash object enters, the trash detector transmits a detecting signal to the controller; a stirrer, connected to the controller, wherein when receiving the detecting signal, the controller controls the stirrer to stir the trash object for reducing an overlap situation where the trash object overlaps with adjacent objects, that achieves a function of batch processing the trash object and further improves the identification accuracy of the trash object; and a control gate, connected to the controller; wherein when receiving the detecting signal, the controller controls the control gate to identify the trash object in a batch manner.

According to another purpose of the present disclosure, providing a recycling method based on deep learning and computer vision technology for a trash sorting device, the recycling method includes: configuring a plurality of artificial neural network models in a controller, wherein each artificial neural network model is trained by images taken in a direction corresponding to a plurality of directions toward which a plurality of cameras are respectively configured; configuring the cameras to photograph a trash object in the plurality of directions respectively and generate a plurality of trash object images; connecting the plurality of cameras to the controller, and transmitting the plurality of trash object images to the controller; identifying a type of the trash object as an identification result according to the plurality of trash object images through each artificial neural network model; combining the identification results of the plurality of artificial neural network models and transmitting the identification results to a voting and selecting algorithm configured in the controller and connected to the plurality of artificial neural network models for generating a determination the type of the trash object; and delivering the trash object to a trash channel corresponding to the determination of the voting and selecting algorithm through a trash sorting device connected to and controlled by the controller.

Preferably, the method may further include: configuring a dynamic object detection algorithm in the controller and processing an image subtraction of the plurality of trash object images taken at a time point and a next time point after the time point for detecting whether or not the trash object is passing by the plurality of cameras through the dynamic object detection algorithm; if the trash object is passing by, the dynamic object detection algorithm generates a command to drive the plurality of artificial neural network models and the voting and selecting algorithm for identifying the type of the trash object passing by the plurality of cameras; if the trash object is not passing by, the plurality of artificial neural network models and the voting and selecting algorithm are not driven.

Preferably, the method may further include: connecting a metal sensor to the controller, using the metal sensor to sense whether or not the trash object is metallic, transmitting a metal detecting signal from the metal sensor to the controller; and combining the metal detecting signal and the determination of the voting and selecting algorithm to identify the type of the trash object.

Preferably, the method may further include: disposing a cover over the trash sorting device to block external light; and disposing a light source under the cover to provide stable light for improving an identification accuracy of the trash object.

Preferably, the method may further include: configuring a trash detector, a stirrer and a control gate on the trash sorting device, and respectively connecting the trash detector, the stirrer and the control gate to the controller; sensing whether or not the trash object enters the trash sorting device using the trash detector, wherein if the trash object enters, the trash detector transmits a detecting signal to the controller; and controlling the control gate to identify the trash object in a batch manner and controlling the stirrer to stir the trash object for reducing an overlap situation where the trash object overlaps with adjacent objects through the controller for improving the identification accuracy of the trash object.

The present disclosure provides a recycling system and method that can process a large amount of trash in a batch manner in comparison with the prior art, wherein multiple cameras are used to photograph trash objects and hence generate the trash object images of different angles. The foregoing trash object images are then respectively transmitted to different artificial neural networks to obtain an identification result of the trash objects. Further, a metal sensor is configured to assist in identification of the trash objects to obtain the final identification result. There is no need to use barcodes or process a characteristic comparison with a database. The recycling system and method disclosed in the present application provide high identification accuracy and high efficiency.

DESCRIPTION OF THE PREFERRED EMBODIMENTS

The advantages, features and technical methods of this invention will be described in detail in order to be understood easier. Moreover, the present invention may be realized in different form and should not be limited to the embodiments described here. On the contrary, the provided embodiments make the disclosure more clear and define the scope of this invention entirely and completely. Further, the present invention is only defined according to the attached claims.

Figure 1:
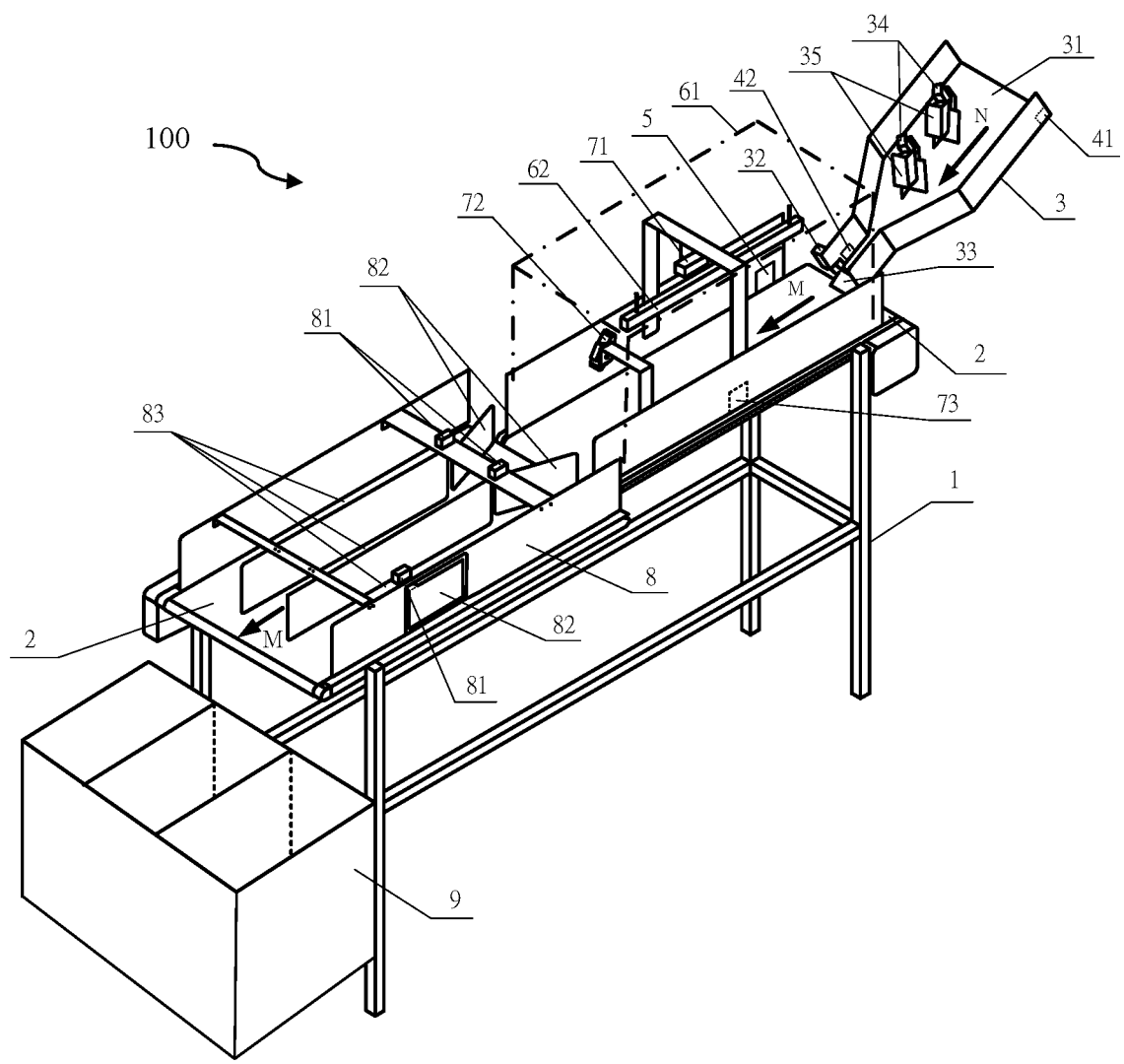
FIG. 1 illustrates the structure of the trash sorting device according to an embodiment of the present invention.

Refer to FIG. 1, which illustrates a trash sorting device 100 according to an embodiment of the present disclosure. The trash sorting device 100 includes the movable base 1, the trash transfer mechanism 2, the trash arraying mechanism 3, the first trash detector 41, the second trash detector 42, the third trash detector 5, the identification unit 660, the trash sorting mechanism 8, the trash storage bin 9, and the controller 600 (referring to FIG. 6), wherein the controller 600 may be, for example, an embedded board or similarly an arithmetic processor with better computing capability.

The trash transfer mechanism 2 is disposed on the base 1 and is used for transferring trash. The trash is transferred in the direction of M, and the trash transfer mechanism 2 may be, for example, a conveyor belt.

Figure 2:
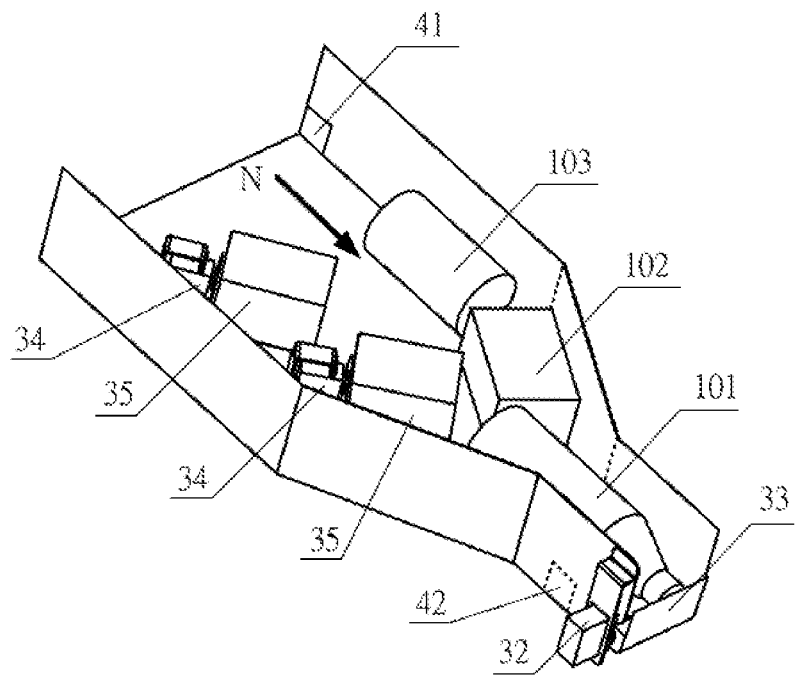
FIG. 2 illustrates the operation of the trash arraying mechanism according to an embodiment of the present invention.
Figure 3:
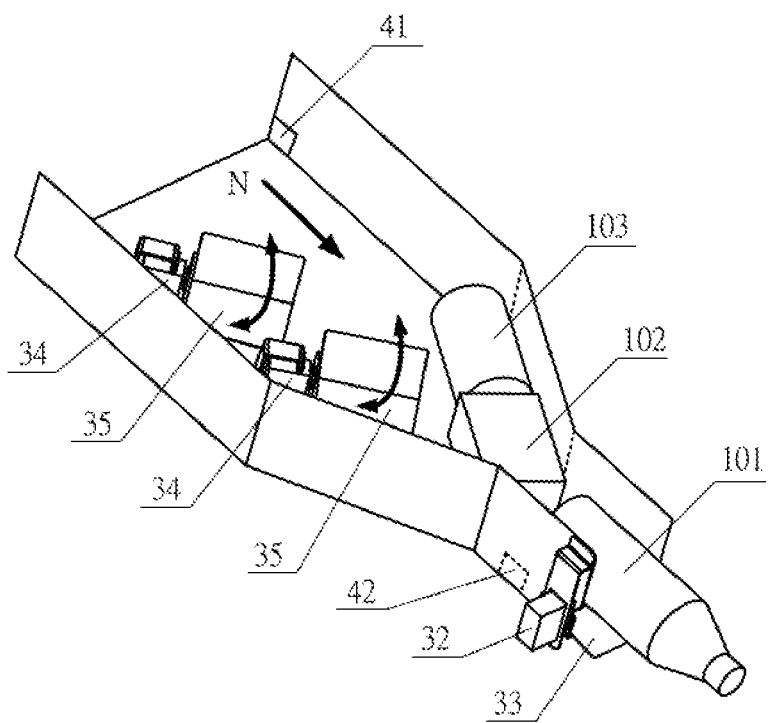
FIG. 3 illustrates the operation of the trash arraying mechanism according to an embodiment of the present invention.

The trash arraying mechanism 3 provides the function of batch processing trash and effectively reducing overlaps between trash objects. The trash arraying mechanism 3 is disposed on a side of base 1 and is connected with the trash transfer mechanism 2. The base of trash arraying mechanism 3 is a trash transfer machine, which is used to deliver the trash objects in the N direction. The upper side of the trash arraying mechanism 3 is provided with an open entrance 31 and the lower side of the trash arraying mechanism 3 is provided with a control gate 33, which is controllable. The control gate 33 is connected to the control gate motor 32. The trash arraying mechanism 3 further includes at least a stirrer motor 34 and a stirrer 35. The user may throw in trash objects through the open entrance 31. The stirrer motor 34 and the stirrer 35 are connected to each other and the stirrer 35 is configured to disturb trash objects thrown in. The trash arraying mechanism 3 is configured to process trash objects in a batch manner. The first trash detector 41 is disposed on the side wall of the open entrance 31 of the trash arraying mechanism 3, and is electrically connected to the controller 600. The first trash detector 41 provides a function of detecting whether or not a trash object enters the trash sorting device 100, and the first detecting signal is produced. The second trash detector 42 is disposed on the side wall on the bottom of the trash arraying mechanism 3. The second trash detector 42 provides a function of detecting whether or not there is still trash inside the trash arraying mechanism 3 and produces a second detecting signal. Referring to FIG. 2 and FIG. 3, which illustrate the operation of the trash arraying mechanism according to an embodiment of the invention, wherein the control gate 33 of the trash arraying mechanism 3 is in a closed state in FIG. 2 while the control gate 3 of the trash arraying mechanism 3 is in an open state in FIG. 3. When the control gate 33 opens, the arrayed trash objects 101~103 move toward the direction N and slide onto the trash transfer mechanism 2. When the trash objects pass by the third trash detector 5, the control gate 3 is triggered again to close. The foregoing process repeats till the second trash detector 42 detects that there is not any trash left inside the trash arraying mechanism 3.

The third trash detector 5 is disposed on the trash transfer mechanism 2 and near the connection portion of trash arraying mechanism 3 and trash transfer mechanism 2. The third trash detector 5 provides a function of detecting whether or not there is trash passing by, and produces the third detecting signal. The third detecting signal is used to control the control gate 33 to be open or closed so as to achieve the function of batch processing the trash objects.

A cover 61 that can block external light is disposed over the trash transfer mechanism 2, and a light source 62 is disposed under the cover 61 to provide stable environmental light for improving the identification accuracy.

The identification unit 660 contains at least the first video camera 71, the second video camera 72, and the metal sensor 73. The identification unit 660 is disposed over the trash transfer mechanism 2 and under the cover 61. The first video camera 71 is disposed to vertically and downward photograph the trash objects on the garbage transfer mechanism 2. The second camera 72 obliquely photographs the trash objects on the trash transfer mechanism 2. The images from the first video camera 71 and the second camera 72 are then inputted into a trash sorting algorithm module based on deep learning and computer vision technology, which are described later, and generate the camera detecting signal. The metal sensor 73 is disposed on a side wall of trash transfer mechanism 2 to provide the function of assisting in identifying metal type trash and providing the metal detecting signal. Lastly, the identifying unit 660 combines the camera detecting signal with the metal detecting signal to generate the fourth detecting signal.

Figure 4:
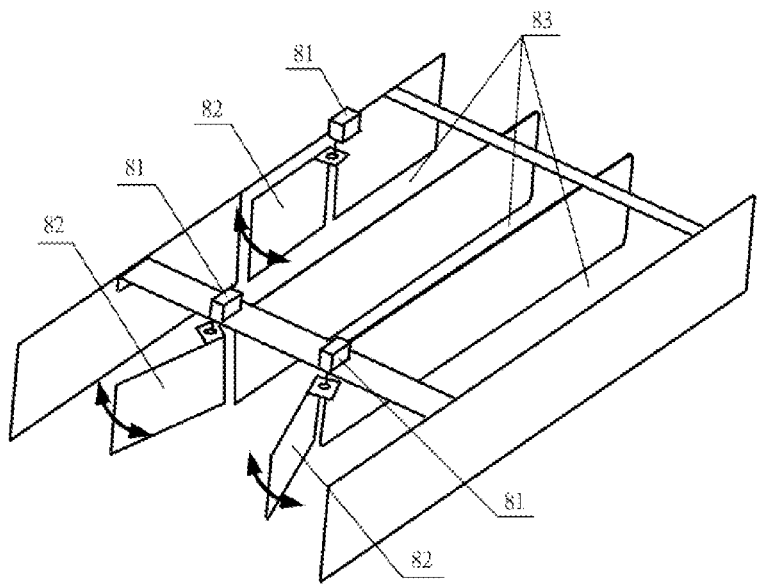
FIG. 4 illustrates the structure of the trash sorting mechanism according to an embodiment of the present invention.
Figure 5:
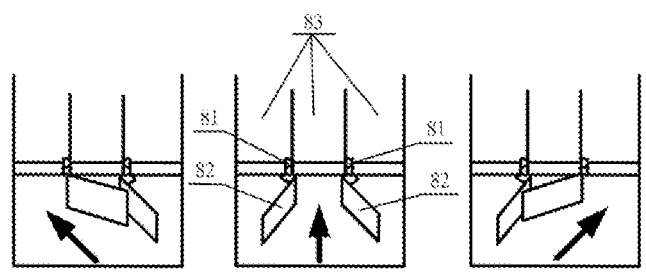
FIG. 5 illustrates the operation of the trash sorting mechanism according to an embodiment of the present invention.

Referring to FIG. 4 and FIG. 5, FIG. 4 illustrates the structure of the trash sorting mechanism according to an embodiment of the present invention; FIG. 5 illustrates the operation of the trash sorting mechanism according to an embodiment of the present invention. The trash sorting mechanism 8 is disposed on the trash transfer mechanism 2 to provide a function of sorting trash. The trash sorting mechanism 8 includes at least two sorting gate drive motors 81, at least two sorting gates 82 and multiple parallel trash channels 83. The sorting gates 82 stably connected to the sorting gate drive motors 81 are configured on one end of each trash tunnel 83, which is closer to the identifying unit 660 than the other end thereof. These two sorting gates 82 decide the open or closed state of the entrances of these three trash tunnels 83 by rotating, wherein each of the trash tunnels 83 is used for passing (or sorting) different types of trash.

Referring to FIG. 1, the trash storage bin 9 is disposed underneath the end of the trash tunnel, and functions as a temporary trash storage location.

The controller 600 may provide information communication between trash transfer mechanism 2, trash arraying mechanism 3, the first trash detector 41, the second trash detector 42, the third trash detector 5, the identification unit 660 and the trash sorting mechanism 8. The controller 600 drives the trash arraying mechanism 3, the trash transfer mechanism 2 and the identification unit 660 according to the first detecting signal, controls the control gate 33 of trash arraying mechanism 3 according to the second detecting signal and the third detecting signal to achieve the function of batch processing trash objects, and controls the sorting gate 82 of the trash sorting mechanism 8 to rotate according to the fourth detecting signal. Referring to FIG. 5, these two gates rotate to form three different trash object passage entrances, respectively for the left trash object passage entrance, the middle trash object passage entrance and the right trash object passage entrance.

Figure 6:
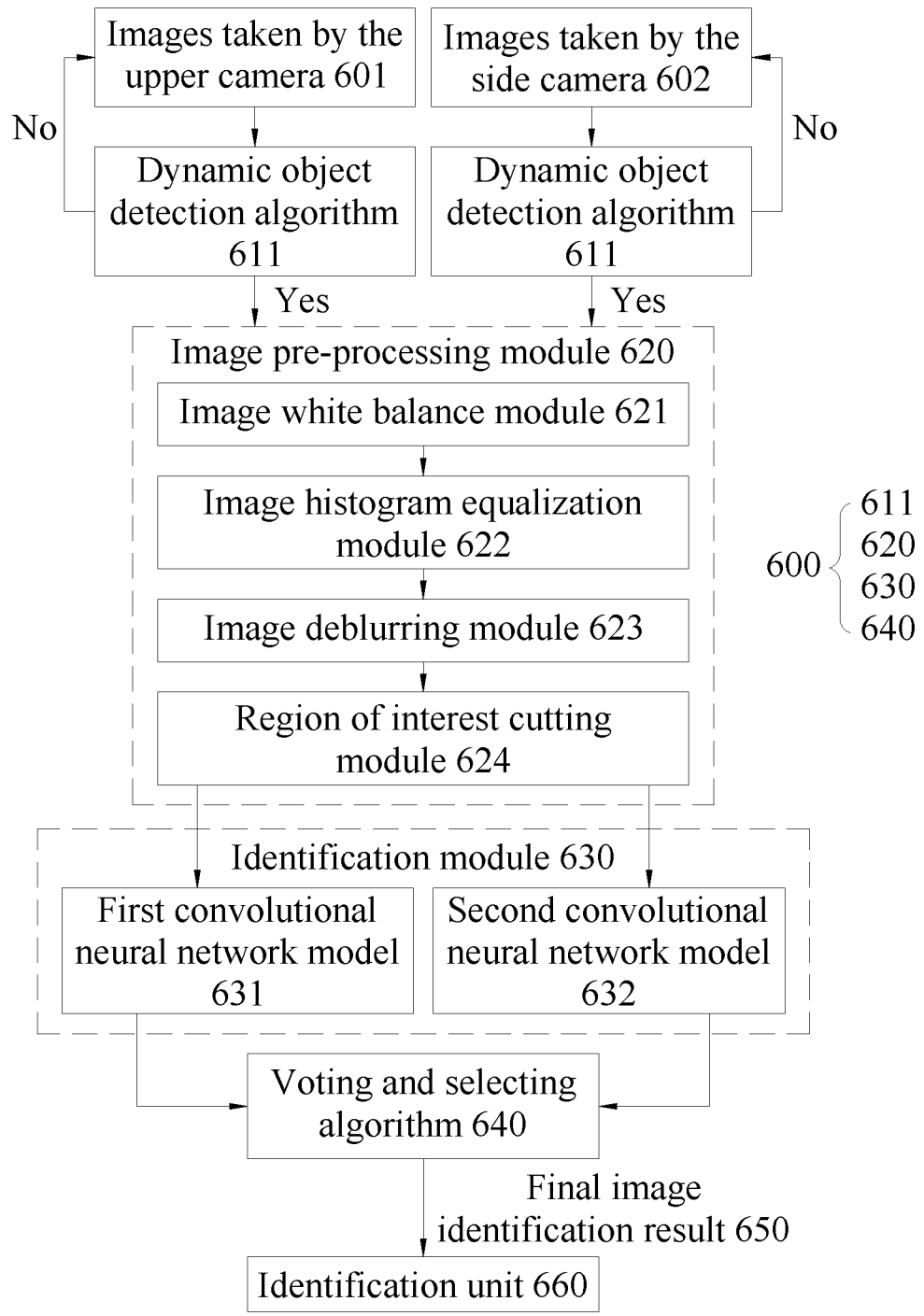
FIG. 6 illustrates a block diagram of the recycling system according to an embodiment of the present invention.

The above mentioned process of generating the fourth detecting signal through the recycling algorithm based on deep learning and computer vision technology is illustrate in FIG. 6, wherein the controller 600 comprises a data storage storing computer codes including dynamic object detection algorithm 611, the image pre-processing module 620, the identification module 630, and the voting and selecting algorithm 640. Detailed descriptions with reference to FIG. 6 are explained below.

FIG. 6 illustrates a block diagram of the trash sorting algorithm module based on deep learning and computer vision technology according to an embodiment of the present invention. The trash sorting algorithm module makes use of the plurality of images shot by the cameras, and further makes use of the dynamic object detection algorithm 611, image pre-processing module 620, identification module 630, and a voting and selecting algorithm 640 to process and identify the images mentioned above.

According to an embodiment, a plurality of cameras are set to respectively photograph trash objects conveyed on the trash transfer mechanism 2 in different directions. According to an embodiment of the present disclosure, the plurality of cameras include two cameras. The images taken by the upper camera 601 in FIG. 6 represent images taken by the first camera 71, while the images taken by the side camera 602 represents images taken by the second camera 72.

In FIG. 6, the dynamic object detection algorithm 611 processes an image subtraction of the plurality of trash object images taken the first camera 71 and/or the second camera 72 by at a time point and a next time point after the time point for detecting whether or not there is any the trash object conveyed on the trash transfer mechanism 2. If yes, a command is generated, and the command will trigger the subsequent algorithm modules (the image pre-processing module 620, the identification module 630, and the voting and selecting algorithm 640); if not, no command is generated and the subsequent algorithm modules will not be activated to reduce the cost of the algorithm system.

The image pre-processing module 620 includes the image white balance module 621, the image histogram equalization module 622, the image deblurring module 623, and the region of interest cutting module 624. The image pre-processing module 620 further transmits the interested range of the image to the identification module 630. Wherein, the image deblurring module 623 is configured to further remove the blur of the blurred image captured when the trash object is moving to increase the subsequent identification accuracy. The region of interest cutting module 624 refers to cut the trash object images and discard the portion of the image which is not the trash object. Overall, the image pre-processing module 620 is disposed to improve the subsequent identification accuracy.

The identification module 630 includes at least two convolutional neural network models. The convolutional neural network models may be, for example, a VGG 16 convolutional network module. Each convolutional neural network model is used to identify images taken by different cameras. The identification module 630 includes two convolutional neural network models. The first convolutional neural network model 631 is trained by images taken by the first camera 71 configured vertically relative to the trash transfer mechanism 2. Therefore, the first convolutional neural network model 631 has higher identification accuracy for the trash object images taken by the first camera 71. The second convolutional neural network model 632 is trained by images taken by the second camera 72. Therefore, the second convolutional neural network model 632 has higher identification accuracy for the trash object images taken by the second camera 72.

According to an embodiment of the present disclosure, the identification module 630 can identify four different types of trash and generate the identification results, but the present disclosure is not limited to this. The types of trash which the identification module 630 can identify are arbitrary, depending on the number of trash types that train the first convolutional neural network model 631 and the second convolutional neural network model 632.

The voting and selecting algorithm 640 receives the identification results of the identification module 630. After many identification results are accumulated, the final image identification result 650 is further determined by statistics. An example of voting and selecting according to an embodiment of the present invention, please refer to Table 1:

TABLE 1

| Identification statistics | First type | Second type | Third type | Fourth type |
|---|---|---|---|---|
| first convolutional neural network model 631 | 1 | 2 | 2 | 5 |
| second convolutional neural network model 632 | 2 | 2 | 2 | 4 |
| Comprehensive result | 3 | 4 | 4 | 9 |

Result of voting and selecting: Fourth type

Please refer to Table 1. The trained first convolutional neural network model 631 and trained the second convolutional neural network model 632 both identify 10 trash object images of a trash object respectively taken by the first camera 71 and the second camera 72. The identification results of each convolutional neural network model are counted by the voting and selecting algorithm 640 to determine the final image identification result 650 (voting and selecting result). In Table 1, according to the identification of the first convolutional neural networks 631, from the 10 images taken from the first camera 71, one of which is identified as the first type of trash, another two are identified as the second type of trash, yet another two are identified as the third type of trash, and the remaining five are identified as the fourth type of trash; according to the identification of the second convolutional neural networks 631, from the 10 images taken from the second camera 72, two of which are identified as the first type of trash, another two are identified as the second type of trash, yet another two are identified as the third type of trash, and the remaining four are identified as the fourth type of trash. The results of the above identification module are statistically calculated by the voting and selecting algorithm 640, and the comprehensive results are shown in Table 1. Table 1 represents that the trash object, captured by the first camera 71 and the second camera 72, is identified as the fourth type of trash by the voting and selecting algorithm 640.

According to an embodiment of the present disclosure, the image identification result 650 (camera detecting signal) obtained by the trash sorting algorithm module shown in FIG. 6 is further combined with the metal detecting signal measured by the metal sensor 73 through the identification unit 660 to generate the fourth signal. The fourth signal decides the rotating action of the sorting gate 82 of the trash sorting mechanism 8, and opens the entrance of the trash object passage corresponding to the type of the trash object, and closes the entrances of the other trash object passages. The trash object is transported to the outlet of the trash object passage by the trash object transfer mechanism 2 for temporary storage to a corresponding position in the trash storage bin 9.

According to an embodiment of the present invention, two cameras are used to respectively photograph trash in the vertical direction and in the direction about 45 degrees from the horizontal line. Together with the above-mentioned trash sorting algorithm module and the metal sensor, the recycling system disclosed in the present invention may at least distinguish four types of trash objects with an identification accuracy higher than 99 % (iron can, aluminum can, Tetra Pak and PET bottle).

Figure 7:
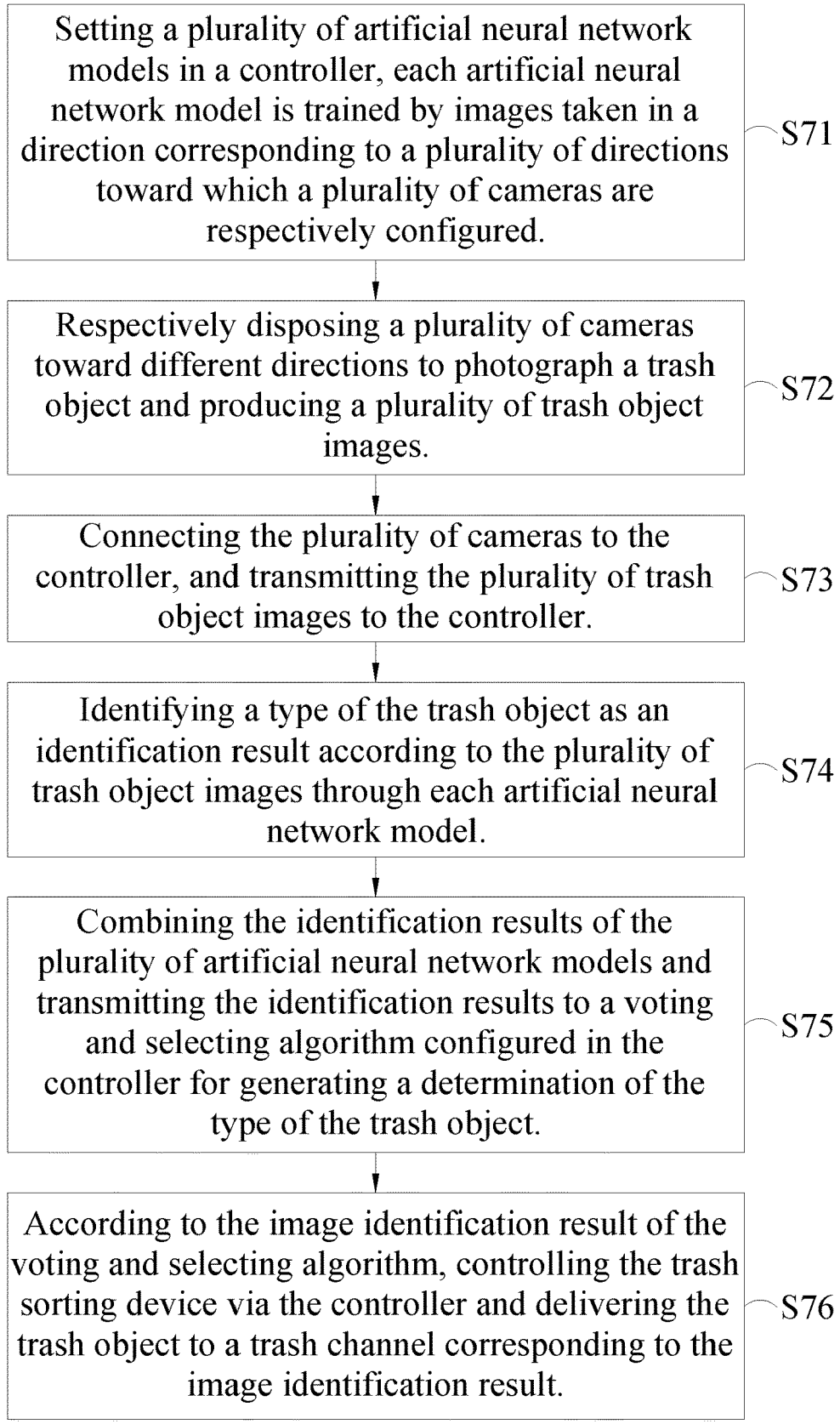
FIG. 7 illustrates a flow chart of the recycling method according to an embodiment of the present invention.

Referring to FIG. 7, which illustrates a flow chart of the recycling method according to an embodiment of the present invention. Please refer to FIG. 1, FIG. 6, and FIG. 7 for further understanding of the flow of the computer implemented recycling method of the present embodiment (S71 to S76):

Step S71: Setting a plurality of artificial neural network models in a controller, each artificial neural network model is trained by images taken in a direction corresponding to a plurality of directions toward which a plurality of cameras are respectively configured. Set the first camera 71 to photograph trash objects in the vertical direction and types of the trash objects are known. Similarly, the second camera 72 is set to photograph the foregoing trash objects as well in an oblique direction. The first camera 71 and the second camera 72 both photograph a plurality of trash object images. Setg the first convolutional neural networks model 631 and the second convolutional neural networks model 632 in the controller 600, wherein the first convolutional neural network model 631 has been trained by the plurality of trash object images taken by the first camera 71 to optimize the parameters of the first convolutional neural network model 631. The second convolutional neural network model 632 has been trained by the plurality of trash object images taken by the second camera 72 to optimize the parameters of the second convolutional neural network model 63.

Step S72: Respectively disposing a plurality of cameras toward different directions to photograph a trash object and producing a plurality of trash object images. The position of the first camera 71 and the second camera 72 and the directions toward which the first camera 71 and the second camera 72 are configured in the step S71 are maintained. Photograph the trash object whose type is unknown and respectively generate the trash object images via the first camera 71 and the second camera 72.

Step S73: Connecting the plurality of cameras to the controller, and transmitting the plurality of trash object images to the controller. Connecting the first camera 71 and the second camera 72 to the controller 600, and transmitting the plurality of trash object images in Step S72 to the controller 600.

Step S74: Identifying a type of the trash object as an identification result according to the plurality of trash object images through each artificial neural network model. Identifying the plurality of trash object images taken by the first camera 71 in Step S72 by the first convolutional neural network model 631, and identifying the plurality of trash object images taken by the second camera 72 in Step S72 by the second convolutional neural network model 632.

Step S75: combining the identification results of the plurality of artificial neural network models and transmitting the identification results to a voting and selecting algorithm configured in the controller for generating a determination of the type of the trash object. The identification result of the first convolutional neural network model 631 and that of the second convolutional neural network model 632 are combined and transmitted to the voting and selecting algorithm to generate an image identification result 650.

Step S76: According to the image identification result of the voting and selecting algorithm, controlling the trash sorting device via the controller and delivering the trash object to a trash channel corresponding to the image identification result. According to the image identification result 650 of Step S75, control the rotation direction of the sorting gate 82 by the controller 600 to deliver the trash object to the trash object passage corresponding to the image identification result 650 and hence store the trash object to a corresponding position in the trash storage bin 9. According to an embodiment of the present invention, the controller 600 may further combine the image identification result 650 with the metal detecting signal detected by the metal sensor 73 to identify the type of the trash object.

Referring to Table 2, which shows the identification accuracy according to an embodiment of present invention for four types of the trash objects (Types 1~4 in Table 2 respectively represent PET bottle, Tetra Paka, iron or aluminum can, and trash of types different from the above types), wherein, the metal sensor is not used for auxiliary identification:

TABLE 2

| | Type 1 | Type 2 | Type 3 | Type 4 |
|---|---|---|---|---|
| Identification accuracy of a single model | 95.3% | 96.7% | 93.2% | 93.8% |
| Identification accuracy of multiple models | 98.5% | 98.1% | 97.1% | 95.9% |

Refer to Table 2, which represents that a recycling system having a plurality of models (convolution neural network models) has a better identification accuracy than that of another recycling system merely having a single model (a single convolution neural network model). That is, according to the concept of the present invention, the trash object photographed in different directions via different cameras with the corresponding thrash object images identified via different convolution neural network modules may be better identified than the trash object merely photographed in a single direction via a camera with the corresponding object trash images identified via one convolution neural network module.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the terms first, second, third, etc. may be used herein to describe various elements, components, loops, circuits, and/or modules, these elements, components, loops, circuits, and/or modules should not be limited by these terms. These terms may be only used to distinguish one element, component, loop, circuit or module from another element, component, loop, circuit or module. Terms such as "first," "second," and other numerical terms when used herein do not imply a sequence or order unless clearly indicated by the context. Thus, a first element, component, loop, circuit or module discussed below could be termed a second element, component, loop, circuit or module without departing from the teachings of the example implementations disclosed herein.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The above mentioned is illustrative only and not restrictive. Any equivalent modifications or changes made to the spirit and scope of the present invention should be included in the extent of the patent application.

What is claimed is:

1. A recycling system based on deep learning and computer vision technology, comprising:
    a plurality of cameras, respectively configured to photograph a trash object in a plurality of directions and producing a plurality of trash object images;
    a controller, connected to the plurality of cameras to receive the plurality of trash object images for identifying a type of the trash object, the controller comprising a data storage storing computer codes including:
        a plurality of artificial neural network models, each trained by images taken in a direction corresponding to the plurality of directions, and identifying the trash object according to the plurality of trash object images to generate a judgment of the type of the trash object; and
        a voting and selecting algorithm, configured to combine the judgment of each artificial neural network model for generating a determination of the type of the trash object; and
    a trash sorting device, configured to receive the trash object and connected to and controlled by the controller;
    wherein the trash sorting device delivers the trash object to a trash channel corresponding to the type of the trash object determined by the voting and selecting algorithm.

2. The recycling system according to claim 1, wherein the computer codes further include a dynamic object detection algorithm, the dynamic object detection algorithm processes an image subtraction of the plurality of trash object images taken at a time point and a next time point after the time point for detecting whether or not the trash object is passing by the plurality of cameras; if the trash object is passing by, the dynamic object detection algorithm generates a command to drive the plurality of artificial neural network models and the voting and selecting algorithm for identifying the type of the trash object passing by the plurality of cameras; if the trash object is not passing by, the plurality of artificial neural network models and the voting and selecting algorithm are not driven.

3. The recycling system according to claim 2, wherein, the trash sorting device further comprises a metal sensor connected to the controller; the metal sensor detects whether or not the trash object is metallic and outputs a metal detecting signal to the controller; and the controller identifies the type of the trash object according to the metal detecting signal and the determination of the voting and selecting algorithm.

4. The recycling system according to claim 3, wherein the trash sorting device further comprising:
    a cover, disposed over the trash sorting device to block external light; and
    a light source, disposed under the cover to provide stable light and improve an identification accuracy of the trash object.

5. The recycling system according to claim 4, wherein the trash sorting device further comprising:
    a trash detector, connected to the controller and sensing whether or not the trash object enters the trash sorting device, wherein if the trash object enters, the trash detector transmits a detecting signal to the controller;
    a stirrer, connected to the controller, wherein when receiving the detecting signal, the controller controls the stirrer to stir the trash object for reducing an overlap situation where the trash object overlaps with adjacent objects, that achieves a function of batch processing the trash object and further improves the identification accuracy of the trash object; and a control gate, connected to the controller; wherein when receiving the detecting signal, the controller controls the control gate to identify the trash object in a batch manner.

6. A computer implemented recycling method based on deep learning and computer vision technology for a trash sorting device, the recycling method comprising:

configuring a plurality of artificial neural network models in a controller, wherein each artificial neural network model is trained by images taken in a direction corresponding to a plurality of directions toward which a plurality of cameras are respectively configured;

configuring the cameras to photograph a trash object in the plurality of directions respectively and generate a plurality of trash object images;

connecting the plurality of cameras to the controller, and transmitting the plurality of trash object images to the controller;

identifying a type of the trash object as an identification result according to the plurality of trash object images through each artificial neural network model;

combining the identification results of the plurality of artificial neural network models and transmitting the identification results to a voting and selecting algorithm configured in the controller and connected to the plurality of artificial neural network models for generating a determination of the type of the trash object; and delivering the trash object to a trash channel corresponding to the determination of the voting and selecting algorithm through a trash sorting device connected to and controlled by the controller.

7. The recycling method according to claim 6, further comprising:

configuring a dynamic object detection algorithm in the controller and processing an image subtraction of the plurality of trash object images taken at a time point and a next time point after the time point for detecting whether or not the trash object is passing by the plurality of cameras through the dynamic object detection algorithm; if the trash object is passing by, the dynamic object detection algorithm generates a command to drive the plurality of artificial neural network models and the voting and selecting algorithm for identifying the type of the trash object passing by the plurality of cameras; if the trash object is not passing by, the plurality of artificial neural network models and the voting and selecting algorithm are not driven.

8. The recycling method according to claim 7, further comprising:

connecting a metal sensor to the controller, using the metal sensor to sense whether or not the trash object is metallic, transmitting a metal detecting signal from the metal sensor to the controller, and combining the metal detecting signal and the determination of the voting and selecting algorithm to identify the type of the trash object.

9. The recycling method according to claim 8, further comprising:

disposing a cover over the trash sorting device to block external light; and disposing a light source under the cover to provide stable light for improving an identification accuracy of the trash object.

10. The recycling method according to claim 9, further comprising:

configuring a trash detector, a stirrer and a control gate on the trash sorting device, and respectively connecting the trash detector, the stirrer and the control gate to the controller;

sensing whether or not the trash object enters the trash sorting device using the trash detector, wherein if the trash object enters, the trash detector transmits a detecting signal to the controller; and controlling the control gate to identify the trash object in a batch manner and controlling the stirrer to stir the trash object for reducing an overlap situation where the trash object overlaps with adjacent objects through the controller for improving the identification accuracy of the trash object.

* * * * *